United States Patent [19]

Strohecker

[11] 3,788,128
[45] Jan. 29, 1974

[54] HUMIDITY INDICATION

[75] Inventor: Daniel E. Strohecker, Galena, Ohio

[73] Assignee: Battelle Development Corporation, Columbus, Ohio

[22] Filed: Jan. 10, 1972

[21] Appl. No.: 216,711

[52] U.S. Cl. ................................. 73/73
[51] Int. Cl. .......................... G01n 31/22
[58] Field of Search ......... 73/73, 335; 116/114 AM

[56] References Cited
UNITED STATES PATENTS

| | | | |
|---|---|---|---|
| 2,105,683 | 1/1938 | Burdick | 73/73 |
| 3,680,364 | 8/1972 | Carrier | 73/73 |
| 2,869,359 | 1/1959 | Offermann | 73/73 |
| 2,017,376 | 10/1935 | Rother et al. | 73/73 |
| 3,425,388 | 2/1969 | West | 73/73 |
| 3,019,638 | 2/1962 | Klein | 73/73 |

*Primary Examiner*—Herbert Goldstein

[57] ABSTRACT

An enclosure comprises a cylindrical transparent plastic upper portion defining a cavity at its lower end, hermetically sealed to a pointed aluminum lower portion carrying an indicator that changes color with humidity. A transparent membrane, permeable to moisture and impermeable to bulk liquid, covers the indicator at its interface with the cavity. The device is driven into a region of soil that is to be planted several hours later, until the upper face is flush with the surface of the soil to locate small passages, communicating between the cavity and the surrounding soil, at a predetermined depth. The indicator thus provides a measure of the humidity at that depth and is visible from above. A thermometer indicates the temperature of the cavity and the soil at that depth.

Just before planting, an optimum concentration of seeds is selected that will provide the desired yield at the relative humidity and temperature then indicated by the device.

17 Claims, 2 Drawing Figures

HUMIDITY INDICATION

BACKGROUND OF THE INVENTION

This invention relates to devices for indicating the relative humidity at predetermined depths from the surface of moisture-containing bodies of soil or the like, and to methods of using the devices in optimizing planting efficiency.

The invention is especially useful in determining the relative humidity at various depths in soil, and for measuring the temperature also where desired, so that those planting vegetables, grains, or any other crops can predict more accurately than heretofore the concentration of seeds needed to be sown over an area to assure substantially a desired spacing between plants. The moisture content and the temperature of the soil at the time of planting affect the germination rate, and if the relative humidity in the soil is not known the risk is high that too little or too much seed will be used.

If less than an optimum concentration of seed is used the yield will be too sparse and wasteful of the land. If more than the best concentration of seed is used the crop may be too closely spaced for optimum growth, which can reduce the yield and be wasteful of seed as well.

Employing the present invention, and referring to information from tables, charts, or other data compiled by the user or furnished by agricultural experiment stations, farmers and other planters can accurately measure the relative humidity and temperature of the soil in areas to be planted, determine how much seed is needed to assure the desired concentration of surviving plants in the soil under the measured conditions, and plant accordingly. Thus the invention can aid in reducing costs in agriculture, conserving land, reducing waste, and improving ecological conditions.

SUMMARY OF THE INVENTION

A typical device according to the present invention for indicating the relative humidity at a predetermined depth from a surface of a moisture-containing body of soil or the like may comprise an elongate enclosure for penetration into the body normally in a substantially vertical position with an upper substantially horizontal plane surface, an upper portion extending downward therefrom with a substantially vertical and smooth outer surface, and a lower portion extending further downward and tapering inward toward its lower end. The lower portion has a substantially horizontal upper surface within the enclosure and supporting thereon an indicator comprising at least one indicating member having a composition that provides a known visible response to selected relative humidity conditions.

A covering, above the indicator, has such composition and thickness as to be at least substantially transparent, permeable to the passage of moisture, and impermeable to bulk liquid. The enclosure and the covering together form a surrounding for the indicator that is permeable to moisture through the covering and impermeable elsewhere. The enclosure forms a cavity above and contiguous to the covering and has at least one passage communicating from the cavity outward through the side of the enclosure to the moisture-containing body. The upper portion of the enclosure above the cavity is at least substantially transparent so that any visible response of the indicator can be seen at the upper surface of the enclosure.

The upper portion of the enclosure typically comprises a right circular cylinder, and the lower portion typically comprises a pointed conical hard tipped member for facilitating penetration into the body. The lower portion preferably comprises a metallic corrosion resistant member, typically comprising predominantly aluminum, providing good conductivity of heat between the indicator and the body and hermetically sealed to the upper portion.

The indicator may comprise an indicating member having a composition that varies in a predetermined manner over its visible area so that the proportion of the area over which the visible response extends is a known function of the relative humidity, and it typically provides visible response in the range of about 30 to 90 percent relative humidity. Alternatively, the indicator may comprise a plurality of members. Where six are used, they would typically be selected to respond to relative humidities of at least about 30, 40, 50, 60, 70, and 80 percent respectively. The indicating member or members in the indicator may typically comprise a composition, such as at least one cobalt salt, that changes color in response to changes in ambient relative humidity. For convenience the indicator may comprise a positioning holder with the indicating members held therein and with the covering hermetically sealed to the positioning holder.

The covering typically comprises a membrane consisting essentially of a polymeric material such as cellulose acetate, regenerated cellulose, ethyl cellulose, silicone rubber, or nylon.

Each passage should be small enough to avoid the entry of liquid from the body into the cavity while providing substantial equilibrium between the humidity in the cavity and the humidity in the body. Typically each passage is about 5 to 25 mils in average diameter.

The device may conveniently comprise also means such as a thermometer for measuring the temperature in the cavity. The device typically is positioned in the moisture-containing body with the upper surface of the elongate enclosure substantially flush with the surface of the body to provide a predetermined depth of the at least one passage communicating between the cavity and the body.

A useful method of using a device according to this invention in optimizing planting efficiency comprises inserting the device into the soil in the area to be planted to position the upper surface of the enclosure substantially flush with the surface of the soil at least about 6 hours before the planting is to begin, determining the approximate relative humidity by observing the visible response of the indicator, planting seeds in the area in a predetermined range of concentration known to be sufficient to provide a preselected yield at the observed relative humidity, and thereby assuring a satisfactory yield without excessive over-concentration of seed as is commonly required in the absence of accurate knowledge of the relative humidity. Tyically a plurality of the devices are inserted into the soil at spaced locations therein to provide a measure of the average humidity. The method may comprise also measuring the temperature in the cavity and selecting the concentration of seeds on the basis of both the relative humidity and the temperature.

BRIEF DESCRIPTION OF THE DRAWINGS

FIG. 2 is a vertical sectional view of a device as in FIG. 1 positioned in a body of soil or the like.

Figure 1:
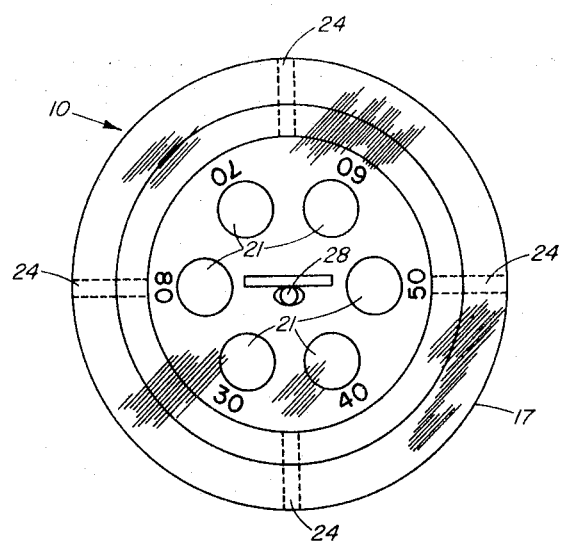
FIG. 1 is a top view of a typical humidity indicator device according to the present invention.
Figure 2:
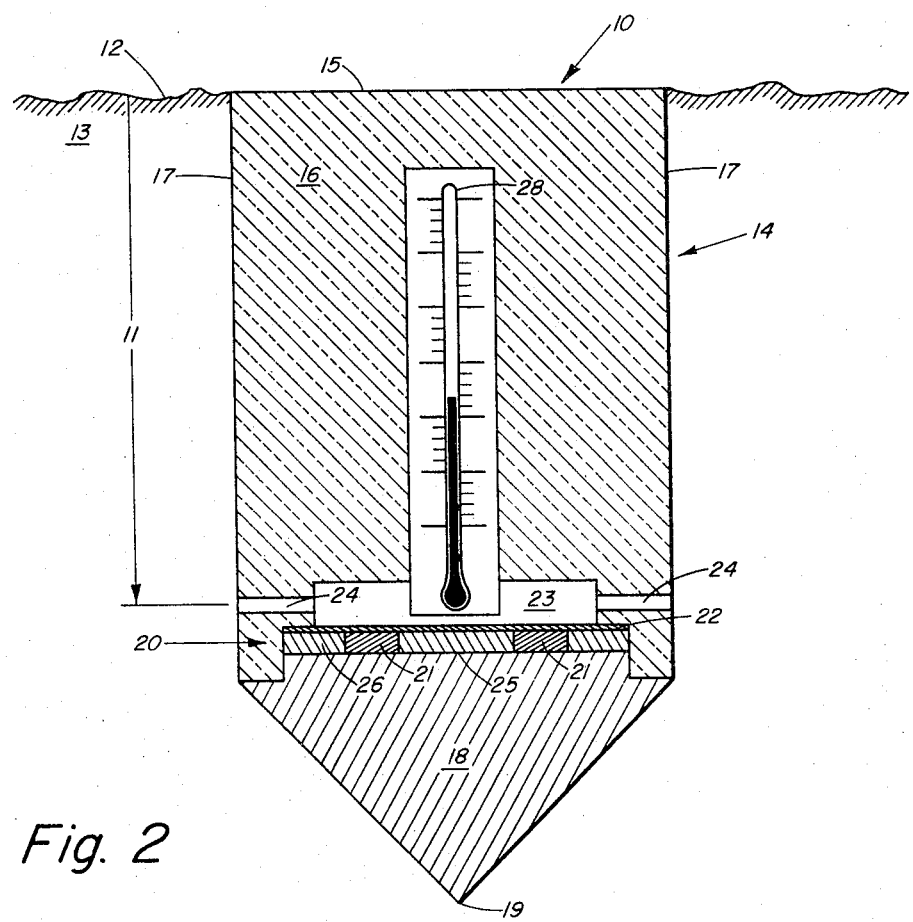

The drawings are not to scale or necessarily in true proportions.

DESCRIPTION OF A PREFERRED EMBODIMENT

Referring to the drawings, a typical device 10 for indicating the relative humidity at a predetermined depth 11 from a surface 12 of a moisture-containing body 13 of soil or the like, comprises an elongate enclosure 14 for penetration into the body 13 normally in a substantially vertical position with an upper substantially horizontal plane surface 15, an upper portion 16 extending downward therefrom with a substantially vertical and smooth outer surface 17, and a lower portion 18 extending further downward and tapering inward toward its lower end 19. The lower portion 18 has a substantially horizontal upper surface 25 within the enclosure 14 and supporting thereon an indicator 20 comprising at least one indicating member 21 having a composition that provides a known visible response to selected relative humidity conditions.

A covering 22, placed above the indicator 20, has such composition and thickness as to be at least substantially transparent, permeable to the passage of moisture, and impermeable to bulk liquid. The enclosure 14 and the covering 22 together form a surrounding for the indicator 20 that is permeable to moisture through the covering 22 and impermeable elsewhere. The enclosure 14 is shaped to form a cavity 23 above and contiguous to the covering 22 and has at least one passage 24 communicating from the cavity 23 outward through the side of the enclosure 14 to the moisture-containing body 13. The upper portion 16 of the enclosure 14 above the cavity 23 is at least substantially transparent so that any visible response of the indicator 20 can be seen at the upper surface 15 of the enclosure 14.

The upper portion 16 of the enclosure 14 typically comprises a right circular cylinder, as shown, and the lower portion 18 typically comprises a pointed conical hard tipped member for facilitating penetration into the body 13. The lower portion 18 preferably is made of a metallic corrosion resistant material such as aluminum, providing good conductivity of heat between the indicator 20 and the body 13, and is hermetically sealed to the upper portion 16.

The indicator 20 may comprise an indicating member having a composition that varies in a predetermined manner over its visible area so that the proportion of the area over which the visible response extends is a known function of the relative humidity. It typically provides visible response in the range of about 30 to 90 percent relative humidity. Alternatively, the indicator may comprise a plurality of members 21, as in FIG. 1, where the six indicating members 21 respond to relative humidities of at least about 30, 40, 50, 60, 70, and 80 percent respectively. The indicating member or members 21 in the indicator 20 may typically comprise a composition, such as at least one cobalt salt, that changes color in response to changes in ambient relative humidity. For convenience the indicator 20 may comprise a positioning holder 26 with the indicating members 21 held therein and with the covering 22 hermetically sealed to the positioning holder 26.

The covering 22 typically comprises a membrane consisting essentially of a polymeric material such as cellulose acetates less than about 1 mil thick, regenerated cellulose less than about 1 mil thick, ethyl cellulose less than about 3 mils thick, silicone rubber less than about 1 mil thick, or nylon less than about 0.5 mil thick.

Each passage 24 should be small enough to avoid the entry of liquid from the body 13 into the cavity 23 while providing substantial equilibrium between the humidity in the cavity and the humidity in the body. Typically, each passage is about 5 to 25 mils in average diameter.

The device 10 may conveniently comprise also means such as a thermometer 28 for measuring the temperature in the cavity. The device 10 typically is positioned in the moisture-containing body 13 with the upper surface 15 of the elongate enclosure 14 substantially flush with the surface 12 of the body 13 to provide a predetermined depth 11 of the passages 24 communicating between the cavity 23 and the body 13, the depth 11 being the same as the level where the seeds are to be planted. The best level is different of course for various crops.

A useful method of using a device 10 in optimizing planting efficiency comprises inserting the device 10 into the soil 13 in the area to be planted to position the upper surface 15 of the enclosure 14 substantially flush with the surface 12 of the soil 13 at least about 6 hours before the planting is to begin, determining the approximate relative humidity by observing the visible response of the indicator 20, planting seeds in the area in a predetermined range of concentration known to be sufficient to provide a preselected yield at the observed relative humidity, and thereby assuring a satisfactory yield without excessive overconcentration of seed as is commonly required in the absence of accurate knowledge of the relative humidity. Typically a plurality of devices 10 are inserted into the soil at spaced locations therein to provide measurements from which to calculate the average humidity for the area at the planting depth 11. The method may comprise also measuring the temperature in the cavity 23 and selecting the concentration of seeds on the basis of both the relative humidity and the temperature.

To determine the range of concentration of the seeds to be planted, after selecting the number of plants desired in the rows or area to be planted, for most efficient and economical use of the land, one divides that number by the average yield rate obtained at the temperature and humidity indicated by the device of this invention. Thus, where the desired number of surviving plants is about 1,000 and the average yield rate for the type of soil at the temperature and humidity measured at the time and place of planting is about 0.67, as determined by available data in any convenient form such as charts or tables, approximately 1,500 seeds should be planted. Where the prevailing conditions indicate an expected yield of only about 0.5, about 2,000 seeds should be planted; while an expected yield of about 0.4 would call for about 2,500 seeds; etc.

The art contains numerous teachings of humidity-sensing chemical compositions and salts, as well as papers and the like containing these compositions and salts, which undergo a visible color change at a selected relative humidity from about 0 up to about 90 percent and even higher relative humidities. Those humidity-sensing compositions, and especially papers, silica gels, and other inorganic substrates incorporating the appropriate humidity-sensing composition are useful for the indicator 20 and the various indicating members 21, upon selection therefrom to employ those having the desired and selected specific color change response at the relative humidities expected to be encountered in the particular moisture-containing body 13 with which the device of the invention is to be utilized. Illustrative and representative, but no necessarily inclusive, of such useful indicators, are humidity-sensing compositions, salts, and the like taught by U. S. Pat. Nos. 2,460,065; 2,460,066; 2,460,067; 2,460,068; 2,460,069; 2,460,070; 2,460,071; 2,460,072; 2,460,073; 2,460,074; 2,580,737; and 2,627,505; and publications such as "Cobaltous Chlorides as a Water Vapor Indicator," A. J. Cameron, Chemistry and Industry, Mar. 13, 1965, page 461; "Colour Changes Which Occur When Co Thiocyanate Impregnated Paper is Exposed to Air May be Used to Measure Humidity," Chemical Processing (London), November, 1960, page 29; "Estimation of Humidity with Cobalt Thiocyanate Paper and Permanent Color Standards," M. E. Solomon, Bulletin Entomological Research, 48 (1957), pages 489–506; and "Use of Cobalt Salts as Indicators for Humidity and Moisture," M.E. Solomon, Ann. Appl. Biology, 32 (1945), pages 75-78.

In a preferred embodiment of the invention, such as is useful in ordinary farming soil, the indicator and its particular members thereof preferably are papers impregnated with the appropriate amounts of $Co(CNS)_2$ providing a color response at the particular desired relative humidity of about 30, 40, 50, 60, 70, and 80 percent, respectively. Solomon's work reported in the aforementioned article in "Bull. Entomological Research" illustrates the high accuracy obtainable in determination of relative humidities using such a cobalt thiocyanate paper as an indicator through careful color matching with standards. In actual field usage of the preferred device, for most purposes, such high accuracy is not needed and the visual color change of the indicator is distinctive enough to provide a practical and useful close approximation of the particular relative humidity being determined. However, a suitable standard color code chart may be used to compare and match visibly with the particular color of the indicator, if more accurate relative humidity readings are desired. In fact, a standard comparison color can be included in the indicator 20 adjacent the changeable areas of the indicator members 21.

The upper portion 16 of the enclosure 14 comprises a material that is substantially transparent and impermeable to moisture. It is hermetically attached to the lower portion 18 and forms therewith around the indicator 20 a surrounding structure that is permeable to moisture through the covering 22 and substantially impermeable elsewhere. The upper portion 16 typically consists essentially of a polymeric material such as a polyester or a polyvinyl compound. Such materials include polyethylene, polyvinyl chloride, nylon, cellulose esters, and polyester (such as glycol terephthalate polymer).

While the forms of the invention herein disclosed constitute presently preferred embodiments, many others are possible. It is not intended herein to metion all of the possible equivalent forms or ramifications of the invention. It is to be understood that the terms used herein are merely descriptive rather than limiting, and that various changes may be made without departing from the spirit or scope of the invention.

I claim:

1. A device for indicating the relative humidity at a predetermined depth from a surface of a moisture-containing body of soil or the like, comprising
    an elongate enclosure for penetration into the body normally in a substantially vertical position with an upper substantially horizontal plane surface, an upper portion extending downward therefrom with a substantially vertical and smooth outer surface, and a lower portion extending further downward and tapering inward toward its lower end,
    the lower portion having a substantially horizontal upper surface within the enclosure and supporting thereon
    an indicator comprising at least one indicating member having a composition that provides a known visible response to selected relative humidity conditions,
    a covering, above the indicator, having such composition and thickness as to be at least substantially transparent, permeable to the passage of moisture, and impermeable to bulk liquid,
    the enclosure and the covering together forming a surrounding for the indicator that is permeable to moisture through the covering and impermeable elsewhere,
    the enclosure forming a cavity above and contiguous to the covering and having at least one passage communicating from the cavity outward through the side of the enclosure to the moisture-containing body,
    the portion of the enclosure above the cavity being at least substantially transparent so that any visible response of the indicator can be seen at the upper surface of the enclosure, and
    the lower portion comprising a metallic corrosion resistant member providing good conductivity of heat between the indicator and the body and hermetically sealed to the upper portion.

2. A device as in claim 1, wherein the upper portion of the enclosure comprises a right circular cylinder.

3. A device as in claim 1, wherein the lower portion comprises a pointed conical hard tipped member for facilitating penetration into the body.

4. A device as in claim 1, wherein the lower portion comprises predominantly aluminum.

5. A device as in claim 1, wherein the indicator comprises an indicating member having a composition that varies in a predetermined manner over its visible area so that the proportion of the area over which the visible response extends is a known function of the relative humidity.

6. A device as in claim 1, wherein the indicator provides visible response in the range of about 30 to 90 percent relative humidity.

7. A device as in claim 1, wherein the indicator comprises members that respond to relative humidities of at least about 30, 40, 50, 60, 70, and 80 percent respectively.

8. A device as in claim 1, wherein the indicator comprises a composition that changes color in response to changes in ambient relative humidity.

9. A device as in claim 8, wherein the composition comprises at least one cobalt salt.

10. A device as in claim 1, wherein the indicator comprises a positioning holder and indicating members held therein.

11. A device as in claim 10, wherein the covering is hermetically sealed to the positioning holder.

12. A device as in claim 1, wherein the covering comprises a membrane consisting essentially of a polymeric material.

13. A device as in claim 12, wherein the polymeric material is cellulose acetate, regenerated cellulose, ethyl cellulose, silicone rubber, or nylon.

14. A device as in claim 1, wherein each passage is small enough to avoid the entry of liquid from the body into the cavity while providing substantial equilibrium between the humidity in the cavity and the humidity in the body.

15. A device as in claim 1, wherein each passage is about 5 to 25 mils in average diameter.

16. A device as in claim 1, comprising also means for measuring the temperature in the cavity.

17. A device as in claim 1, positioned in the moisture-containing body with the upper surface of the elongate enclosure substantially flush with the surface of the body to provide a predetermined depth of the at least one passage communicating between the cavity and the body.

* * * * *